E. HALMA.
SPEED CHANGING, REVERSING, AND BRAKING GEARING.
APPLICATION FILED DEC. 4, 1915.
Reissued May 9, 1916. 14,131.
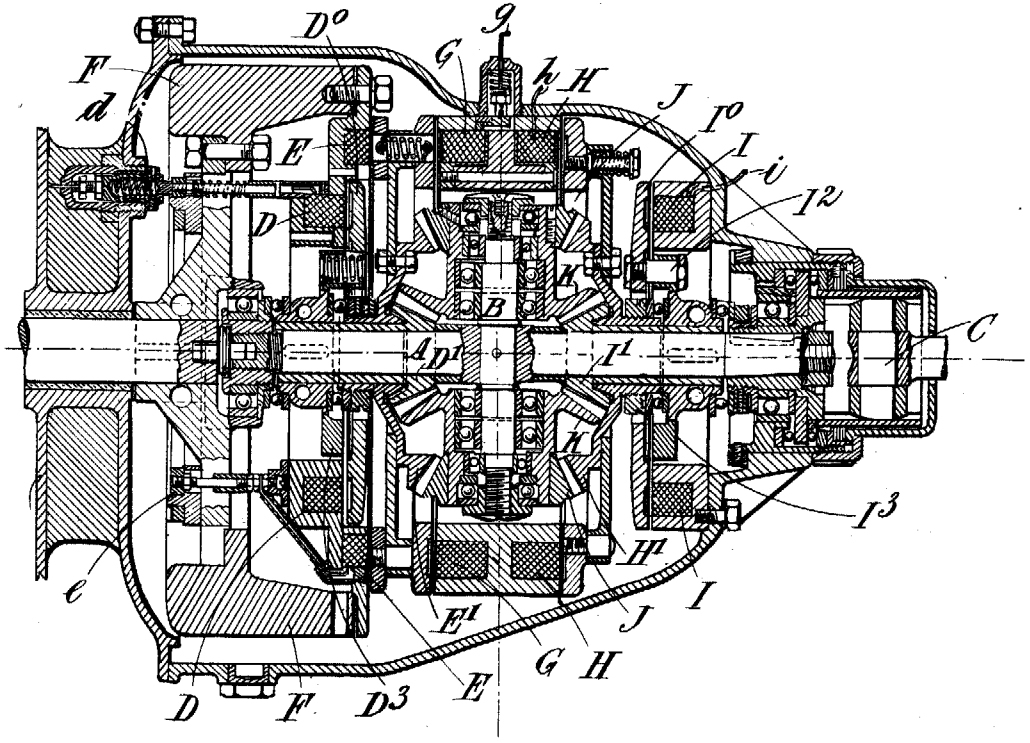
Inventor.
Edward Halma
by Foster Freeman Watson & Coit
Attys.

UNITED STATES PATENT OFFICE.

EDOUARD HALMA, OF PARIS, FRANCE, ASSIGNOR, BY DIRECT AND MESNE ASSIGNMENTS, TO MENCO-ELMA SYNDICATE, LIMITED, OF LONDON, ENGLAND.

SPEED CHANGING, REVERSING, AND BRAKING GEARING.

14,131. Specification of Reissued Letters Patent. Reissued May 9, 1916.

Original No. 1,049,577, dated January 7, 1913, Serial No. 673,193. Application for reissue filed December 4, 1915. Serial No. 65,137.

*To all whom it may concern:*

Be it known that I, EDOUARD HALMA, a citizen of the Republic of France, residing at Paris, France, have invented certain new and useful Improvements in Speed Changing, Reversing, and Braking Gearing, of which the following is a specification.

This invention has for its object to provide speed-changing and reversing and braking gearing operated by electromagnetic means, the said gear comprising bevel toothed wheels which are always in gear and are arranged on shafts forming a cross and comprising also a spherical epicyclic wheel train.

The improved gear comprises a series of magnetic clutches and brakes controlling, or rendering stationary, a part of the toothed gear of the epicyclic system, so as to give either forward running, at the required speed, or backward running, or braking action.

I will describe this invention with reference to the accompanying drawing which represents in longitudinal section, gear constructed in accordance with this invention.

The gear comprises two shafts A and B, intersecting each other at right angles. The shaft B, receives its motion from the motor as hereinafter explained, and transmits this motion to the driven shaft A controlling a road-wheel of the vehicle through the medium of a Cardan joint C.

In order to obtain the various speeds in forward running, the reversal, or backward running, the direct engagement and the braking of the vehicle, a system of magnetic clutches and brakes is employed, this system comprising the magnetic clutches D and E in connection with the fly-wheel F and therefore rotating at the speed of a motor. It also comprises the magnetic brakes G, H and I secured to the casing containing the mechanism so that these brakes G, H and I are always stationary. The magnetic clutches are supplied with current through any suitable rubbing contacts such as the spring contacts *d* and *e*, while the magnetic brakes are supplied with current through the conductors *g h* and *i*. The said clutches and brakes are operated by the magnetic attraction of their corresponding disks which are connected with the bevel sun wheels $D^1$, $E^1$, $H^1$, $I^1$, which wheels are concentric with the shaft A, and are always in engagement with the planetary wheels J and K, which are integral with each other, or fixed together, and are mounted on the shaft B. From the disk $I^0$ extends pins such as $I^2$ which fit and slide endwise in corresponding round holes in the ring $I^3$, the latter being fixed on the long hub of the wheel $I^1$. Thus the disk $I^0$ engages the toothed wheel $I^1$ so that there is no relative motion between them; in like manner is the disk $D^0$ non-rotatably engaged with the toothed wheel $D^1$.

The operation of this speed changing gear, constructed as in the example illustrated, to give four speeds in forward running, one speed in backward running and braking action, is as follows: To obtain the first forward running speed, when the motor has been started, the current is sent through the clutch D, and brake H. The wheel $D^1$ then rotates at the same speed as the motor and the wheel $H^1$ is held stationary. The planetary wheel J integral with, or fixed to, the planetary wheels K, and operated by the wheel $D^1$, being constrained to rotate on themselves, react on the stationary wheel $H^1$, and cause the shaft B, and consequently the shaft A to move in the direction in which the motor rotates. The second forward-running speed is obtained either by sending the current through the clutch E, and the brake H, or by sending the current through the clutch D, and brake I, the first mode being preferred as causing less wear of the parts. The second speed thus obtained is equal to half the speed obtained in direct engagement. For the third forward-running speed, the current is supplied to the clutch E, and the brake I. In this case the wheel $E^1$ rotates at the speed of the motor and the pinion $I^1$, is stationary. The planetary wheels K integral with, or fixed to, the planetary wheels J being constrained to rotate on themselves, react on the stationary pinion $I^1$ and cause the shaft B, and consequently the shaft A, to move in the direction of rotation of the motor. The fourth forward-running speed can be obtained by passing the current through D and E, the planetary wheels J and K being thus jammed (the ratio of the numbers of teeth being different) and driving the shaft B at the same speed as the clutches D and E, this speed corresponding to direct engagement. The reversal, or backward running, is obtained by causing the current to pass through the clutch D and the brake G. The wheel $D^1$ then runs at the speed of the motor while the wheel $E^1$ is rendered stationary. The planetary wheels J integral with, or fixed to, the planetary wheels K driven by the pinion $D^1$ are constrained to rotate on themselves and in this movement they react on the pinion $E^1$ which is stationary and then take around the shaft B, and consequently the shaft A, in a direction opposite to that of the rotation of the motor. In this way any desired graduation of the speeds can be obtained by combining the ratios of the number of teeth which are in engagement in the pairs of bevel toothed wheels. The braking of the car is effected by passing the current through H and I. The planetary wheels J and K being thus rendered stationary on their pinions $H^1$ and $I^1$ prevent the shaft B, and consequently the shaft A, from moving and the vehicle stops. This braking action is comparable to the clutching for direct engagement. In all cases (and especially for braking) it is desirable to apply a gradually increasing current so as to avoid jerks.

The current required for the clutching and braking electromagnets can be supplied from any suitable source of electricity. For example I employ a small dynamo of 12 volts and 15 amperes operated for instance by the arrangement usually employed for the lighting installation on ordinary vehicles, which dynamo will, without any addition, fulfil all the functions required for the perfect running of the vehicle and for internal and external lighting.

The hereinbefore described arrangement which is more especially applicable to motor road vehicles presents, over the hitherto known speed changing gears, the following advantages: It does away with cone and disk clutch gears which are always very complicated and easily get out of order. It does away with levers, supports, tubes, and rods required in other systems to alter the speed. It suppresses the sliding gear sleeve and the sudden engagement of the driving teeth which causes disagreeable noise and jerks injurious to the working members of the apparatus as hitherto constructed. The pinions with large teeth are small in number and are in constant engagement with one another. They do not therefore require being brought into gear, which bringing into gear has the defect of causing considerable wear on the working surface of the teeth.

The mechanism can be adapted to the motor so as to form a combination of reduced weight and occupying less space and facilitating the application to any chassis.

By introducing a resistance suitable for the electric current, it is possible to obtain in the various manipulations for altering the speed, reversing, and braking, any desired progressive action.

What I claim as my invention and desire to secure by Letters Patent is:—

1. In an electromagnetic speed-change gearing, the combination of an epicyclic wheel train having two shafts at right angles and fast to each other and a revoluble magnetic clutch adapted to engage one of the sun wheels of the train and a stationary magnetic brake adapted to act on another sun wheel of the train for the purposes described.

2. In an electromagnetic speed changing gearing, the combination of a drive shaft and a driven shaft, a planetary shaft fast thereto, two pairs of oppositely disposed sun gears loose on said driven shaft and planet gears loose on said planetary shaft interconnected with one another and engaging said sun gears, a magnetic clutch on the drive shaft adapted to clutch either sun gear of one pair and a stationary magnetic brake adapted to engage one sun gear of the other pair thereby giving changes of speed of the power driven shaft.

3. In an electromagnetic speed changing gearing, the combination of a drive shaft and a driven shaft, a planetary shaft fast thereto, two pairs of oppositely disposed sun gears loose on said driven shaft and planet gears loose on said planetary shaft interconnected with one another engaging said sun gears, a magnetic clutch on the drive shaft adapted to clutch either sun gear of one pair and two stationary magnetic brakes adapted to engage the sun gears of the other pair thereby giving changes of speed or braking of the power driven shaft.

4. In an electromagnetic speed changing gearing, the combination of a drive shaft and a driven shaft, a planetary shaft fast thereto, two pairs of oppositely disposed sun gears loose on said driven shaft and planet gears loose on said planetary shaft interconnected with one another engaging said sun gears, a magnetic clutch on the drive shaft adapted to clutch either sun gear of one pair and two stationary magnetic brakes adapted to engage the sun gears of the other pair thereby giving changes of speed or braking of the power driven shaft and a reversing magnetic brake adapted to engage and hold from rotation that one of the clutch actuated sun gears which is larger in diameter relatively to that of its own planet than is its companion sun gear relatively to the planet of the said companion.

5. In an electromagnetic change gearing the combination of a drive shaft and a driven shaft, a cross shaft fast thereto, an epicyclic wheel train of gears loosely mounted on said driven shaft and cross shaft with its planets interconnected with one another, an electromagnetic clutch between said drive shaft and said train to drive one or another of the gears on the drive shaft, an electromagnetic brake adapted to act on one or another of the gears on the driven shaft to vary the speed of the latter.

6. In an electromagnetic change-speed gearing, the combination of an epicyclic wheel train having two shafts at right angles and fast to each other, and operatively connected to the road-wheel of an automobile, and a revoluble magnetic clutch adapted to engage one of the sun wheels of the train and a stationary magnetic brake adapted to act on another sun wheel of the train for the purposes described.

7. In an electromagnetic speed-changing gearing, the combination of a drive shaft and a driven shaft, said driven shaft operatively connected to the road-wheel of an automobile, two pairs of oppositely disposed sun gears loose and turning on a bearing co-axial with the said drive and driven shafts, and planet gears loose on said planetary shaft interconnected with one another and engaging said sun gears, a magnetic clutch on the drive shaft adapted to clutch either sun gear of one pair and a stationary magnetic brake adapted to engage one sun gear of the other pair, thereby giving changes of speed or braking of the power driven shaft.

8. In an electromagnetic speed-changing gearing, the combination of a drive shaft and a driven shaft, a planetary shaft fast thereto, said driven shaft operatively connected to the road-wheel of an automobile, two pairs of oppositely disposed sun gears loose and turning on a bearing co-axial with said drive and driven shafts and planet gears loose on said planetary shaft interconnected with one another engaging said sun gears, a magnetic clutch on the drive shaft adapted to clutch either sun gear of one pair and two stationary magnetic brakes adapted to engage the sun gears of the other pair thereby giving changes of speed or braking of the power driven shaft.

9. In an electromagnetic speed-changing gearing, the combination of a drive shaft and a driven shaft, a planetary shaft fast thereto, said driven shaft operatively connected to the road-wheel of an automobile, two pairs of oppositely disposed sun gears loose and turning on a bearing co-axial with said drive and driven shafts and planet gears loose on said planetary shaft interconnected with one another engaging said sun gears, a magnetic clutch on the drive shaft adapted to clutch either sun gear of one pair and two stationary magnetic brakes adapted to engage the sun gears of the other pair thereby giving changes of speed or braking of the power driven shaft and a reversing magnetic brake adapted to engage and hold from rotation that of the clutch-actuated sun gears which is larger in diameter relatively to that of its own planet than is its companion sun gear relatively to the planet of said companion.

10. In an electromagnetic change gearing the combination of a drive shaft and a driven shaft, a cross shaft fast thereto, said driven shaft operatively connected to the road-wheel of an automobile, an epicyclic wheel train of gears loosely mounted on said driven shaft and cross shaft with its planets interconnected with one another, an electromagnetic clutch between said drive shaft and said train to drive one or another of the gears on the drive shaft, an electromagnetic brake adapted to act on one or another of the gears on the driven shaft to vary the speed of the latter.

11. In an electromagnetic speed-changing gear, the combination of a drive shaft and a driven shaft, a planetary shaft fast to the latter, two driving sun-gears loose and turning on a bearing co-axial with the said drive and driven shafts, planet gears loose on said planetary shaft interconnected with one another and engaging said gears, a magnetic clutch on the drive shaft adapted to clutch either sun-gear, and a stationary magnetic brake adapted to engage with one of the sun-gears which is larger in diameter relatively to its own planet than is its companion sun-gear relatively to the planet of said companion.

12. In an electromagnetic speed-changing gear, the combination of a drive shaft and a driven shaft, a planetary shaft fast to the latter, said driven shaft operatively connected to the road-wheel of an automobile, two driving sun-gears loose and turning on a bearing co-axial with the said drive and driven shafts, planet gears loose on said planetary shaft interconnected with one another and engaging said gears, a magnetic clutch on the drive shaft adapted to clutch either sun-gear, and a stationary magnetic brake adapted to engage with one of the sun-gears which is larger in diameter relatively to that of its own planet than is its companion sun-gear relatively to the planet of said companion.

13. In a gear-change mechanism the combination of a driving shaft and a driven shaft, two separate co-axial sun-wheels, a bearing on which each is loose, two interconnected planet pinions geared with the said sun-wheels and dimensioned to form with them two gearings one of a lower gear ratio than is the other, a planetary shaft carrying said planet pinions, an inseverable operative connection connecting said planet shaft to the driven shaft, two electromagnetic clutches one of them between said driving shaft and each of the said co-axial sun-wheels, and a stationary magnetic brake adapted to act on that one of the two said gearings which has a higher gear ratio than its companion.

14. In a gear-change mechanism the combination of a driving shaft and a driven shaft, two separate co-axial sun-wheels, a bearing on which each is loose, two interconnected planet pinions geared with the said sun-wheels and dimensioned to form with them two gearings one of a lower gear ratio than is the other, a planetary shaft carrying said planet pinions, an inseverable operative connection connecting said planet shaft to the driven shaft, two electromagnetic clutches one of them between said driving shaft and each of said co-axial sun-wheels, a stationary magnetic brake adapted to act on that one of the two said gearings which has a higher gear ratio than its companion, a toothed ring concentric with the driven shaft and engaged with one of said planetary pinions, a bearing on which said toothed ring is loose, and a stationary magnetic brake adapted to engage with and to disengage that ring.

15. In a gear-change mechanism the combination of a driving shaft and a driven shaft, two separate co-axial sun-wheels, a bearing on which each is loose, two interconnected planet pinions geared with the said sun-wheels and dimensioned to form with them two gearings one of a lower gear ratio than is the other, a planetary shaft carrying said planet pinions, an inseverable operative connection connecting said planet shaft to the driven shaft, two electromagnetic clutches one of them between said driving shaft and each of the said co-axial sun-wheels, a stationary magnetic brake adapted to act on that one of the two said gearings which has a higher gear ratio than its companion, a toothed ring concentric with the driven shaft and engaged with one of said planetary pinions, a bearing on which said toothed ring is loose, a stationary magnetic brake adapted to engage with and to disengage that ring, a second toothed ring concentric with the driven shaft and engaged with the other of said planetary pinions, a bearing on which said second toothed ring is loose, and a stationary magnetic brake adapted to engage with and to disengage that second ring.

16. In a gear-change mechanism the combination of a driving shaft and a driven shaft, said driven shaft operatively connected to the road-wheel of an automobile, two separate co-axial sun-wheels, a bearing on which each is loose, two interconnected planet pinions geared with the said sun-wheels and dimensioned to form with them two gearings one of a lower gear ratio than is the other, a planetary shaft carrying said planet pinions, an inseverable operative connection connecting said planet shaft to the driven shaft, two electromagnetic clutches one of them between said driving shaft and each of the said co-axial sun-wheels, and a stationary magnetic brake adapted to act on that one of the two said gearings which has a higher gear ratio than its companion.

17. In a gear-change mechanism the combination of a driving shaft and a driven shaft, said driven shaft operatively connected to the road-wheel of an automobile, two separate co-axial sun-wheels, a bearing on which each is loose, two interconnected planet pinions geared with the said sun-wheels and dimensioned to form with them two gearings one of a lower gear ratio than is the other, a planetary shaft carrying said planet pinions, an inseverable operative connection connecting said planet shaft to the driven shaft, two electromagnetic clutches one of them between said driving shaft and each of the said co-axial sun-wheels, a stationary magnetic brake adapted to act on that of the two said gearings which has a higher gear ratio than its companion, a toothed ring concentric with the driven shaft and engaged with one of said planetary pinions, a bearing on which said toothed ring is loose, and a stationary magnetic brake adapted to engage with and to disengage that ring.

18. In a gear-change mechanism the combination of a driving shaft and a driven shaft, said driven shaft operatively connected to the road-wheel of an automobile, two separate co-axial sun-wheels, a bearing on which each is loose, two interconnected planet pinions geared with the said sun-wheels and dimensioned to form with them two gearings one of a lower gear ratio than is the other, a planetary shaft carrying said planet pinions, an inseverable operative connection connecting said planet shaft to the driven shaft, two electromagnetic clutches one of them between said driving shaft and each of the said co-axial sun-wheels, a stationary magnetic brake adapted to act on that one of the two said gearings which has a higher gear ratio than its companion, a toothed ring concentric with the driven shaft and engaged with one of said planetary pinions, a bearing on which said toothed ring is loose, a stationary magnetic brake adapted to engage with and to disengage that ring, a second toothed ring concentric with the driven shaft and engaged with the other of said planetary pinions, a bearing on which said second toothed ring is loose, and a stationary magnetic brake adapted to engage with and to disengage that second ring.

EDOUARD HALMA.

Witnesses:
LOUIS E. WEBER,
CHAS. P. PRENLY.

Copies of this patent may be obtained for five cents each, by addressing the "Commissioner of Patents, Washington, D. C."

Correction in Reissue Letters Patent No. 14,131.

It is hereby certified that in Reissue Letters Patent No. 14,131, granted May 9, 1916, upon the application of Edouard Halma, of Paris, France, for an improvement in "Speed Changing, Reversing, and Braking Gearing," an error appears in the printed specification requiring correction as follows: Page 8, line 30, claim 7, after the comma insert the words and comma *a planetary shaft fast thereto,;* and that the said Letters Patent should be read with this correction therein that the same may conform to the record of the case in the Patent Office.

Signed and sealed this 25th day of July, A. D., 1916.

[SEAL.]

F. W. H. CLAY,
*Acting Commissioner of Patents.*

Cl. 74—34.